United States Patent [19]

Steiner et al.

[11] Patent Number: 4,729,120
[45] Date of Patent: Mar. 1, 1988

[54] METHOD OF, AND CIRCUIT ARRANGEMENT FOR, FUNCTION CONTROL OF ULTRASONIC ALARM INSTALLATIONS

[75] Inventors: Peter Steiner, Jona; Rudolf Genähr, Männedorf; David Siegwart, Meilen, all of Switzerland

[73] Assignee: Cerberus AG, Männedorf, Switzerland

[21] Appl. No.: 782,716

[22] PCT Filed: Feb. 7, 1985

[86] PCT No.: PCT/EP85/00037
§ 371 Date: Sep. 23, 1985
§ 102(e) Date: Sep. 23, 1985

[87] PCT Pub. No.: WO85/03591
PCT Pub. Date: Aug. 15, 1985

[30] Foreign Application Priority Data

Feb. 13, 1984 [CH] Switzerland ............ 762/84

[51] Int. Cl.⁴ .................. G08B 13/16; G08B 29/00
[52] U.S. Cl. .................. 367/94; 340/515; 340/554; 367/93
[58] Field of Search ............ 367/94, 93; 340/554, 340/515

[56] References Cited

U.S. PATENT DOCUMENTS 3,383,678  5/1968  Palmer ........................ 367/94
3,932,870  1/1976  Shapiro et al. .............. 340/554
4,482,889 11/1984  Tsuda et al. ................ 367/94

FOREIGN PATENT DOCUMENTS 612026   6/1979  Switzerland .
1006362  9/1965  United Kingdom .

Primary Examiner—Glen R. Swann, III

[57] ABSTRACT

In an ultrasonic alarm installation, ultrasonic waves are continuously emitted into a monitored region and a frequency shift caused by a moving object, e.g. an intruder, is received by an ultrasonic receiver and evaluated by virtue of the Doppler effect for generating an alarm signal. For testing the ultrasonic alarm installation the emitted ultrasonic waves are modulated by a plurality of modulation frequencies in the range of the frequency shifts effective for triggering the alarm signal. Thus, the function test can be carried out using the same electrical evaluation circuit as for generating the alarm signal. The plurality of modulation frequencies conjointly with the switch-off of the transmitter signal has the effect that the reflected signals, which arrive at the ultrasonic receiver with different phase relationships, are not vectorially added to the ultrasonic transmitter signal to yield zero, so that a reliable function control is always ensured. Furthermore and for determining changes in the monitored region, the time decay of the modulation-caused signal is compared with a reference signal in the electrical evaluation circuit after switch-off of the modulation signal.

10 Claims, 4 Drawing Figures

METHOD OF, AND CIRCUIT ARRANGEMENT FOR, FUNCTION CONTROL OF ULTRASONIC ALARM INSTALLATIONS

CROSS-REFERENCE TO RELATED APPLICATION

This application is related to the commonly assigned, copending United States application Ser. No. 06/783,230, filed Sept. 23, 1985, and entitled METHOD OF, AND CIRCUIT ARRANGEMENT FOR, FUNCTION CONTROL OF ULTRASONIC ALARM INSTALLATIONS. The disclosure of this application is incorporated herein by reference.

BACKGROUND OF THE INVENTION

The present invention relates to a new and improved method, of, and circuit arrangement, for testing an ultrasonic alarm installation.

In its more particular aspects, the present invention specifically relates to a method of testing an ultrasonic alarm installation in which ultrasonic waves of a predetermined frequency are emitted by an ultrasonic transmitter into a monitored region or space. Ultrasonic waves from the monitored region or space are received by an ultrasonic receiver. The received ultrasonic waves are converted into an electrical signal which is fed to an electrical evaluation circuit. This electrical evaluation circuit triggers an alarm signal upon a predetermined frequency deviation of the received from the emitted ultrasonic waves. A frequency deviation is also generated during a test phase and simulates an alarm state.

Such a method is known, for example, for Swiss Pat. No. 612,026. In such method the fact is utilized that a person moving in the monitored region causes, due to the Doppler effect, a frequency shift in a part of the ultrasonic waves by an amount corresponding to the speed of movement. This frequency shift is signaled by the evaluation circuit as an alarm state. To this end the frequency of the received ultrasonic waves is continuously compared with the transmitting frequency, and an alarm signal is triggered at frequency deviations characteristic for a moving person as described, for example, in Swiss Pat. No. 556,070.

In the method described in Swiss Pat. No. 612,026, a function control of the ultrasonic alarm installation is achieved due to the fact that, during a test phase, the pure transmission frequency is not utilized as the comparison frequency for the receiver, but a modulated oscillation. The modulation is selected such that after mixing with the receiver signal there is formed a Doppler signal which corresponds to that of a moving person. Also the propagation time difference between the ultrasonic waves which travel through the monitored space and an electrical reference signal which is transmitted directly from the transmitter to the receiver or the evaluation circuit, can be used for function control.

These known ultrasonic alarm installations in which ultrasound of a predetermined frequency is continuously emitted into the monitored region or space, however, have the disadvantage that a standing wave field is formed in the monitored region or space. In this standing wave field the ultrasonic waves reflected at various points within the monitored region or space are vectorially added to the emitted ultrasonic waves in the receiver to form the receiver signal in dependence upon their amplitude and phase relationship. Depending on the arrangement of the reflecting objects in the monitored region or space and the environmental conditions, the receiver signal can therefore fluctuate within wide limits from zero to a maximum. Additionally the signal continuously changes within wide limits, for example, due to temperature fluctuations, changes in the humidity of the air or the air pressure, and accordingly the sensitivity of the alarm installation fluctuates uncontrollably. In the presence of a weak receiver signal the multiplication with a modulated reference signal, however, produces only a weak Doppler signal so that the function control becomes ineffective. Therefore, also changes in the ultrasonic field, e.g. by installation of a sound absorbing wall in front of the transmitter during a sabotage attempt, cannot be distinguished from accidental fluctuations of the wave field.

SUMMARY OF THE INVENTION

Therefore, with the foregoing in mind, it is a primary object of the present invention to provide a new and improved method of, and circuit arrangement for, testing an ultrasonic alarm installation and which method and circuit arrangement do not exhibit the aforementioned drawbacks and shortcomings of the prior art.

Another and more specific object of the present invention aims at providing a new and improved method of, and circuit arrangement for, testing an ultrasonic alarm installation and which method and circuit arrangement are as universally applicable as possible and to a large extent independent of environmental conditions.

A further important object of the present inventions aims at providing a new and improved method of, and circuit arrangement for, testing an ultrasonic alarm installation and which method and circuit arrangement permit reliably recognizing and with the least possible circuit complications, substantially static or very slow changes in the monitored region or space, and distinguishing such changes from accidental sensitivity fluctuations in order to reliably detect sabotage attempts.

Now in order to implement these and still further objects of the invention which will become more readily apparent as the description proceeds, the method of the present invention is manifested by the features that, the frequency of the emitted ultrasonic waves is modulated during the test phase by a predetermined frequency spectrum which includes the frequency deviation effective for triggering the alarm signal. After switching-off of the modulated signal, the time decay of the received signal is evaluated by comparison to a reference signal for generating an alarm signal.

In the method according to the invention, the fact is utilized that the ultrasonic waves, which are reflected by different objects in the monitored region or space, possess a different propagation time from the ultrasonic tranmitter to the ultrasonic receiver so that the timedecay of the modulation signal after swi-ch-off proceeds differently if changes are made in the monitored region, for instance, if a screening wall is placed into the monitored region or space in order to sabotage the alarm installation and render it ineffective. The presence of such screening wall is shown by a comparison with the normal time decay of the modulation-caused signal and which time decay is represented by a reference signal.

It is advantageous to reduce the formation of standing waves in the monitored region or space by includng in the modulation-caused signal as many frequencies as possible. The function control will then also operate reliably if the ultrasonic alarm installation is accidentally insensitive.

By means of an intermittent complete switch-off of the ultrasonic transmitter signal it is achieved that the emitted and the reflected signals cannot interfere with each other and thereby the primary reason for the formation of standing waves is eliminated.

As alluded to above, the invention is not only concerned with the aforementioned method aspects, but also relates to a novel construction of a circuit arrangement for carrying out the same. Generally speaking, the inventive apparatus comprises a circuit arrangement for testing an ultrasonic alarm installation containing:

an ultrasonic transmitter for emitting ultrasonic waves of a predetermined frequency into a monitored region or space;

an ultrasonic receiver for receiving ultrasonic waves from the monitored region or space;

an electrical evaluation circuit connected to the ultrasonic receiver and for triggering an alarm signal upon a predetermined frequency deviation of the received from the emitted ultrasonic waves; and means for also generating a frequency deviation during a test phase in order to thereby simulate an alarm state or condition.

To achieve the aforementioned measures, the inventive circuit arrangement, in its more specific aspects, comprises:

means for generating the frequency deviation during the test phase which are constructed such as to modulate the frequency of the ultrasonic waves emitted by the ultrasonic transmitter, with a number of frequencies such that the modulation includes the frequency deviation which triggers the alarm signal; and the evaluation circuit is constructed such that the time decay of the modulated signal received by the ultrasonic receiver, after the modulation has been switched off, is compared to a reference signal and triggers an alarm signal upon a predetermined deviation of the received signal from the reference signal.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
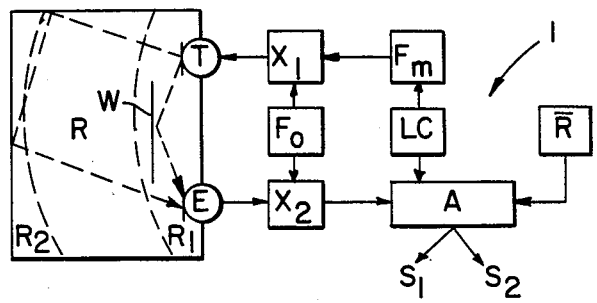
FIG. 1 is a schematic block circuit diagram of a first exemplary embodiment of the invention ultrasonic alarm installation.

Describing now the drawings, it is to be understood that to simplify the showing thereof only enough of the structure of the ultrasonic alarm installation has been illustrated therein as is needed to enable on skilled in the art to readily understand the underlying principles and concepts of this invention. Turning now specifically to FIG. 1 of the drawings, the ultrasonic alarm installation 1 illustrated therein by way of example and not limitation, will be seen to comprise an ultrasonic transmitter T for emitting ultrasonic waves into a monitored region or space R. After reflection from walls, boundaries or objects in the monitored region or space R the ultrasonic waves are received by an ultrasonic receiver E and converted into an electrical signal which is conducted to an electrical evaluation circuit A. In the normal operating state the ultrasonic transmitter T is controlled by a frequency generator $F_o$ operating at a frequency $f_o$ and caused to continuously emit ultrasound or ultrasonic waves at this frequency $F_o$ of, e.g. 20 kHz. As long as no movement occurs within the monitored region or space R, the receiver E only receives radiation of this frequency $f_o$. At the output of a series-connected mixer or multiplier $X_2$, which is likewise controlled by the frequency generator $F_o$, then there does not appear a difference frequency or frequency deviatior so that the evaluation circuit A does not detect a frequency deviation and does not generate an alarm signal.

As soon, however, as a movement takes place in the monitored region or space R, for example by an intruder, the ultrasonic receiver E receives, in addition to radiation of the frequency $f_o$, ultrasonic waves having a frequency which is shifted depending upon the speed of movement of the intruder in accordance with the Doppler effect. At the aforementioned ultrasound frequency $f_o$ and at practically occurring movement speeds of persons, this frequency shift is in the range of 0 to 500 Hz. The evaluating circuit A now evaluates the electrical signal generated by the ultrasonic waves received by the ultrasonic receiver E, by passing the electrical signal through a mixer or multiplier $X_2$ in a manner which is known as such. There is thus detected the presence of such frequency shifts or deviations and, if necessary, an alarm signal is triggered. During this operation additionally still further criteria can be taken into consideration in order to eliminate disturbing effects to a wide extent.

Figure 2:
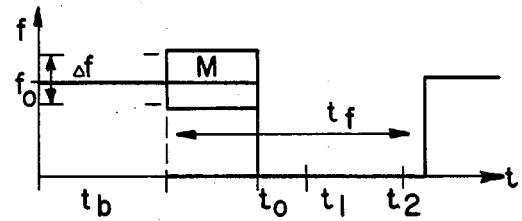
FIG. 2 is a graph showing the time relationships existing in the ultrasound alarm installation shown in FIG. 1 during a test phase.

For the purpose of function control or testing the function of the ultrasonic alarm installation 1 the ultrasound waves emitted by the ultrasonic transmitter T are modulated at the start of a test phase $t_f$, as shown in FIG. 2, by means of a modulation frequency generator $F_m$ controlled by a control circuit LC. The type of modulation is selected such that there does not only appear a single modulation frequency but at least a number of frequencies or an entire modulation band m or frequency band or spectrum $\Delta F$. At only one modulation frequency of the modulation frequency generator $F_m$, the signal shape, for example, may be selected such as to deviate from a sinusoidal shape, e.g. may have a rectangular or saw-tooth shape, so that the greatest possible number of harmonics appear. The modulation frequency or signal may also constitute a noise or pseudo noise signal having a continuous frequency spectrum. By means of this multi-frequency modulation it is achieved that no pronounced maxima and minima occur ever if a standing wave field is formed so that the function control or testing operation also works faultlessly even when the ultrasonic installation alarm due to the vectorial signal addition of reflected signals of different phase relationships, just accidentally assumes an insensitive state or condition.

Figure 3:
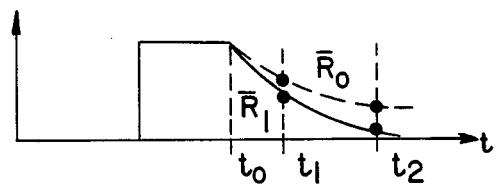
FIG. 3 is a graph showing the time decay relationships of the signals which are compared during the test phase in the ultrasonic alarm installation shown in FIG. 1.

After a predetermined time $t_o$, the modulation frequency or signal is switched off. As shown in FIG. 3, after the switch-off a temporal or time decay $\overline{R}_1$ of the electrical signal originating from the reflected modulated ultrasonic waves received by the ultrasonic receiver E, is observed. This decaying electrical signal is compared with a reference signal $\overline{R}_o$ supplied by a reference signal generator $\overline{R}$. The slowly decaying electrical signal generated by the ultrasonic receiver E after the sudden switch-off of the modulation frequency or signal generator $F_m$, appears because the ultrasonic waves require a certain propagation time from the ultrasonic transmitter T to the ultrasonic receiver E depending on the length of the travel path. Thus, in comparison to reflection from a close object such as the object $R_1$, reflection from a more distant object such as the object $R_2$ requires a correspondingly longer propagation time. In the event, therefore, that the effective observed temporal or time decay $\overline{R}_1$ of the modulation-caused signal deviates from the reference signal $\overline{R}_o$ supplied by the reference signal generator $\overline{R}$, which reference signal $\overline{R}_o$ represents the normal state or condition of the monitored region or space $\overline{R}$, this deviation indicates a change in the monitored region or space R. In order to suppress an undesired alarm signal generation, the reference signal generator $\overline{R}$ may also be constructed such as to store, e.g. during arming the alarm installation, at predetermined moments of time the state and the effective time decay and compare in a later test phase the then appearing time decay with the stored time decay or compare the time decay during a test phase with the time decay of a preceding test phase.

The comparison of the actually observed time decay of the modulation-caused signal with the reference signal $\overline{R}_o$ can be made at predetermined moments of time $t_1$ and $t_2$, as shown in FIG. 3, these predetermined moments of time $t_1$ and $t_2$ corresponding to specific distances of reflecting objects. In this manner the evaluation can be restricted to a selected spatial region within the monitored region or space R and very close or very distant objects can be left out of consideration during the function control. For example, the evaluation may be made in such a manner that an alarm signal is generated if the time decay of the modulation-caused signal after a predetermined time is faster than the time decay of the reference signal $\overline{R}_0$. This can be taken as on indication that an ultrasound absorbing wall W has been placed into the associated region in order to render inoperative the ultrasonic alarm installation 1.

Figure 4:
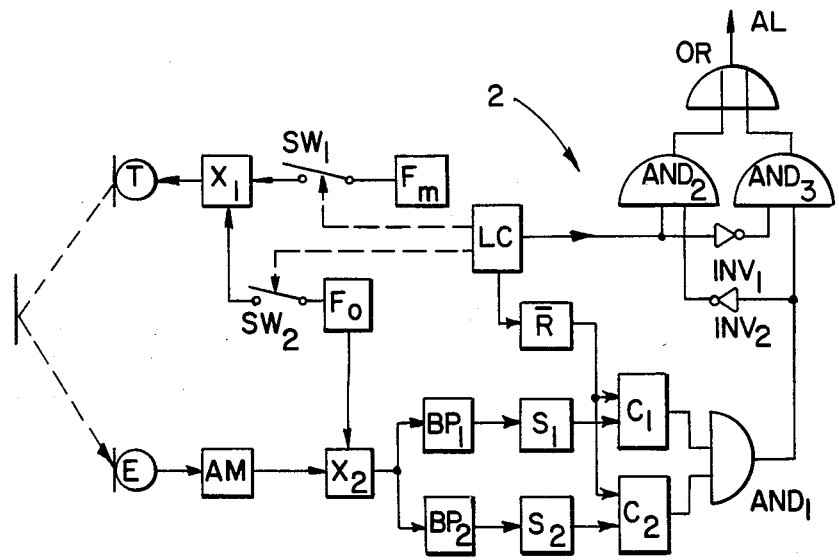
FIG. 4 is a schematic block circit diagram of a second exemplary embodiment of the invention ultrasonic alarm installation operating on the basis of the Doppler principle.

FIG. 4 shows in a schematic block circuit diagram and as a second exemplary embodiment of the invention ultrasonic alarm installation an ultrasonic alarm installation 2 containing an evaluation circuit which includes two Doppler evaluating channels, and additionally a function control or testing circuit. In this ultrasonic alarm installation 2 an ultrasonic transmitter T is controlled by a frequency generator $F_o$ operating at a frequency $f_o$ via a mixer $X_1$. Furthermore, a modulation frequency generator $F_m$ is provided which, at the start of a test phase, controls the mixer $X_1$ by means of a switch $SW_1$ actuated by a logic control circuit LC. The modulation frequency $f_o$ causes modulation of the ultrasonic waves emitted by the ultrasonic transmitter T as described above. The modulation generator $F_m$ is selected such that its frequencies are located in both Doppler evaluation channels for the Doppler frequency shift so that the modulation-caused electrical signal can be processed by the evaluation circuit without changes.

The ultrasonic waves from the monitored region or space are received by an ultrasonic receiver E and converted into an electrical signal which is conducted to the two Doppler evaluating channels via an amplifier AM which may be constructed so as to be frequency-selective for the vicinity of the frequency $f_o$, and via a mixer or multiplier $X_2$ which is likewise controlled by the frequency generator $F_o$. The two Doppler evaluation channels respectively contain band-passes $BP_1$ and $BP_2$ with different band widths for the Doppler frequencies of the mixer or multiplier $X_2$, e.g. for a lower range between 20 and 50 Hz and an upper range between 60 and 100 Hz. In addition there are provided respective series-connected storage circuits or memories $S_1$ and $S_2$ which may be constructed as integrators holding a signal for a predetermined period of time. Respective comparator circuits $C_1$ and $C_2$ only generate a signal when there is exceeded a predetermined difference between the input signal received from the associated storage circuits or memories $S_1$ and $S_2$, and a reference signal produced by a reference signal generaor $\overline{R}$ during the test phase. This reference signal is changed during the test phase in a predetermined manner by means of a logic control circuit LC.

The two Doppler evaluation channels are connected to an AND gate $AND_1$. The AND gate $AND_1$ passes an output signal to one input of an AND gate $AND_3$ and, via an inverter $INV_2$, to one input of an AND gate $AND_2$ only if a signal is present in both the Doppler evaluation channels, i.e. if the Doppler frequencies are present in both frequency ranges or if both Doppler evaluation channels are functioning properly. The other input of the AND gate $AND_3$ is controlled by the logic control circuit LC via an inverter $INV_1$. The other input of the AND gate $AND_2$ is directly controlled by the logic control circuit LC. The outputs of both AND gates $AND_2$ and $AND_3$ are connected to the inputs of an OR gate OR which generates an alarm signal AL if one of the AND gates $AND_3$ or $AND_2$ produces an output signal. By means of this aforedescribed circuit it is achieved that, during the normal operating phase in which no test signal is generated so that the AND gate $AND_2$ is closed but the AND gate $AND_3$ is open, an alarm signal AL is triggered via the AND gate $AND_3$ if Doppler signals due to an intruder are present in both Doppler evaluation channels and an output signal appears at the output of the AND gate $AND_1$. Contrary thereto, during the test phase the reference signal generated by the logic control circuit LC is present so that the AND gate $AND_2$ is opened. However, the AND gate $AND_3$ is closed via the inverter $INV_1$ and the generation of the alarm signal AL is blocked by the inverter $INV_2$ if a signal is present at the output of the AND gate $AND_1$ due to the fact that the test signals arrive properly via the two Doppler evaluation channels. If, however, no output signal appears at the AND gate $AND_1$, the alarm signal AL is triggered via the AND gate $AND_2$. Such alarm signal AL indicates inoperability of the ultrasonic alarm installation 2, e.g. as a result of sabotage, component failure or other defects.

Using the described evaluation circuit, the advantages of multi-path evaluation are preserved. These advantages reside in testing whether Doppler signals characteristic of the movement of persons appear simultaneously or sequentially within the holding time of the storage circuits or memories $S_1$ and $S_2$. On the other hand, the function of all components, including both Doppler evaluation channels, can be simultaneously checked by the same calculation circuit.

Variations for other suitable evaluation circuits are within the scope of the inventive concept, e.g. evaluation circuits having only one evaluation channel or more than two.

While there are shown and described present preferred embodiments of the invention, it is to be distinctly understood that the invention is not limited thereto, but may be otherwise variously embodied and practiced within the scope of the following claims.

What we claim is:

1. A method of testing an ultrasonic alarm installation, comprising the steps of:
   generating ultrasonic waves of a predetermined frequency using an ultrasonic transmitter;
   emitting said ultrasonic waves generated by said ultrasonic transmitter, into a predetermined region to be monitored;
   receiving ultrasonic waves originating from said monitored region by means of an ultrasonic receiver and thereby converting said received ultrasonic waves into an electrical signal;
   feeding said electrical signal to an electrical evaluation circuit;
   processing said electrical signal and triggering by means of said electrical evaluation circuit, an alarm signal upon a predetermined frequency deviation of said received ultrasonic waves from said emitted ultrasonic waves;
   producing said predetermined frequency deviation during a test phase of the operation of the ultrasonic alarm installation;
   said step of producing said predetermined frequency deviation during said test phase entailing the steps of:
   producing a predetermined frequency spectrum includng said predetermined frequency deviation effective for triggering said alarm signal, using a modulation frequency generator;
   modulating said frequency of said ultrasonic waves emitted by said ultrasonic transmitter by said predetermined frequency spectrum including said frequency deviation effective for triggering said alarm signal;
   generating a reference signal using a reference signal generator;
   switching off at least said modulation frequency generator; and
   after switching off said modulation frequency generator, evaluating the time decay of a modulation-caused electrical signal by comparing said decaying modulation-caused electrical signal and triggering an alarm signal when a predetermined deviation is exceeded between said decaying modulation-caused electrical signal and said reference signal.

2. The method as defined in claim 1, wherein:
   said step of producing said predetermined frequency spectrum entails producing as said predetermined frequency spectrum, a frequency spectrum having a high harmonics content.

3. The method as defined in claim 1, wherein:
   said step of producing said predetermined frequency spectrum entails producing as said predetermined frequency spectrum, a noise signal.

4. The method as defined in claim 1, wherein:
   said step of producing said predetermined frequency spectrum entails producing as said predetermined frequency spectrum, a pseudo noise signal.

5. The method as defined in claim 1, wherein:
   said step of comparing said decaying modulation-caused electrical signal in said electrical evaluation circuit entails comparing said decaying modulation-caused electrical signal with said reference signal at least at one moment of time after switch-off of said modulation frequency generator.

6. The method as defined in claim 5, wherein:
   during said step of comparing said decaying modulation-caused electrical signal and said reference signal at least at one moment of time after switch-off of said modulation frequency generator, carrying out said comparison at a first moment of time corresponding to a lower limit of the propagation distance travelled by the ultrasonic waves from an ultrasound reflecting object to said ultrasonic receiver, and at a second moment of time corresponding to an upper limit of the propagation distance travelled by the ultrasonic waves from an ultrasound reflecting object to said ultrasonic receiver.

7. A circuit arrangement for testing an ultrasonic alarm installation, comprising:
   an ultrasonic transmitter for emitting ultrasonic waves of a predetermined frequency into a region to be monitored;
   an ultrasonic receiver for receiving ultrasonic waves from said monitored region and converting said ultrasonic waves into an electrical signal;
   an electrical evaluation circuit connected to said ultrasonic receiver for processing said electrical signal and for triggering an alarm signal upon a predetermined frequency deviation of said received ultrasonic waves from said ultrasonic waves emitted by said ultrasonic transmitter;
   means for producing said predetermined frequency deviation during a test phase of the operation of the ultrasonic alarm installation;
   said means for producing said predetermined frequency deviation during said test phase comprising:
   a modulation frequency generator generating a predetermined frequency spectrum including said frequency deviation effective for triggering said alarm signal;
   said modulation frequency generator being operatively connected to said ultrasonic transmitter in order to modulate said predetermined frequency of said ultrasonic waves emitted by said ultrasonic transmitter, by said predetermined frequency spectrum including said frequency deviation effective for triggering said alarm signal;
   a reference signal generator which is circuit-connected in said electrical evaluation circuit;
   said ultrasonic receiver, upon switching-off of said modulation frequency generator, generating a decaying modulation-caused electrical signal;
   comparator means which are circuit-connected in said electrical evaluation circuit; and
   said comparator means, after switch-off of said modulation frequency generator, comparing said decaying, modulation-caused electric signal generated by said ultrasonic receiver and said reference signal generated by said reference signal generator in order to produce said alarm signal when a predetermined deviation is exceeded between said decaying, modulation-caused electrical signal and said reference signal.

8. The circuit arrangement as defined in claim 7, wherein:
said modulation frequency generator is constructed to generated a modulation frequency of high harmonics content.

9. The circuit arrangement as defined in claim 7, wherein:
said modulation frequency generator constitutes a noise signal generator.

10. The circuit arrangement as defined in claim 7, wherein:
said modulation frequency generator constitutes a pseudo noise signal generator.

* * * * *

UNITED STATES PATENT OFFICE
CERTIFICATE OF CORRECTION

PATENT NO. : 4,729,120

DATED : March 1, 1988

INVENTOR(S) : PETER STEINER et al

It is certified that error appears in the above-identified patent and that said Letters Patent are hereby corrected as shown below:

Column 1, line 34, "for", second occurrence, should read -- from --.

Column 3, line 66, please delete "invention" and insert --inventive--

Column 4, line 24, after "the" please insert --ultrasonic--

Column 4, line 18, beginning with the word "In" please start a new paragraph

Column 4, line 28, please delete "deviatior" and insert --deviation--

Column 5, line 1, please delete "ever" and insert --even--

Column 6, line 27, please delete "generaor" and insert --generator--

Column 7, line 7, please delete "calculation" and insert --evaluation--

Column 10, line 2, please delete "generated" and insert --generate--

Signed and Sealed this

Second Day of August, 1988

Attest:

DONALD J. QUIGG

Attesting Officer

Commissioner of Patents and Trademarks